United States Patent [19]

Takaki

[11] 4,380,989

[45] Apr. 26, 1983

[54] IGNITION SYSTEM FOR INTERNAL COMBUSTION ENGINE

[75] Inventor: Iwao Takaki, Chiryu, Japan

[73] Assignee: Nippondenso Co., Ltd., Kariya, Japan

[21] Appl. No.: 208,346

[22] Filed: Nov. 19, 1980

[30] Foreign Application Priority Data

Nov. 27, 1979 [JP] Japan .......................... 54-164698[U]
Dec. 18, 1979 [JP] Japan .......................... 54-165316

[51] Int. Cl.[3] .......................... F02P 11/00; F02P 1/00; H02M 3/22; F02P 1/08

[52] U.S. Cl. ................ 123/644; 123/597;618;609;606

[58] Field of Search ............... 123/597, 644, 609, 606, 123/607, 610, 618, 620; 315/209 T, 209 M; 330/13, 263; 307/362, 363; 324/126; 361/86, 361/91, 256, 263

[56] References Cited

U.S. PATENT DOCUMENTS

| | | | |
|---|---|---|---|
| 3,421,069 | 1/1969 | Minks | 123/597 |
| 3,841,287 | 10/1974 | Nielsen | 123/597 |
| 3,902,471 | 9/1975 | Brungsbarg | 123/644 |
| 4,114,582 | 9/1978 | Rabur et al. | 123/644 |
| 4,153,032 | 5/1979 | Chateau | 123/644 |
| 4,176,645 | 8/1979 | Jundt et al. | 123/644 |
| 4,196,711 | 4/1980 | Daumer | 123/644 |
| 4,267,813 | 5/1981 | Hobne et al. | 123/644 |
| 4,275,702 | 6/1981 | Jundt et al. | 123/644 |

*Primary Examiner*—Raymond A. Nelli
*Attorney, Agent, or Firm*—Cushman, Darby & Cushman

[57] ABSTRACT

An ignition system for an internal combustion engine in which the primary voltage applied across the primary winding of the ignition coil is detected together with the secondary current flowing through the secondary winding of the ignition coil, and the electrical characteristic of the secondary circuit of the ignition coil supplying the arc energy is calculated on the basis of the detected signals thereby controlling the primary current supplied to the primary winding of the ignition coil on the basis of the result of calculation, so that the secondary circuit of the ignition coil can exhibit the desired electrical characteristic for supplying the arc energy of desired level.

16 Claims, 17 Drawing Figures

IGNITION SYSTEM FOR INTERNAL COMBUSTION ENGINE

BACKGROUND OF THE INVENTION

This invention relates to improvements in the structure of ignition systems for internal combustion engines. More particularly, the present invention relates to an improved ignition system for an internal combustion engine in which circuits for detecting the level of spark energy supplied to the spark plugs in the engine and controlling the value of primary current of the ignition coil on the basis of the result of energy level detection are additionally provided so that spark energy of predetermined level can be supplied to the spark plugs in the engine.

It is known that, in a prior art ignition system for an internal combustion engine, the duration of secondary current flowing through the ignition coil is detected to control the value of primary current supplied to the ignition coil so that the secondary current duration can be controlled or maintained at a predetermined length of time. It is also known that, in another prior art ignition system having a concern with the aforementioned one, the detected value of secondary current is integrated to calculate the area, and the value of primary current is controlled on the basis of the calculated area so that the integrated amount of secondary current can be controlled or maintained at a predetermined setting. However, in both of these prior art ignition systems, the spark energy cannot always be accurately detected since the secondary current is only detected. It has therefore been difficult for these prior art ignition systems to strictly meet the operation requirements of the engine when an excess or shortage of spark energy results from, for example, a variation of the secondary voltage.

SUMMARY OF THE INVENTION

It is therefore a primary object of the present invention to provide an improved ignition system for an internal combustion engine in which the values of primary voltage and secondary current in the ignition coil are detected to calculate the arc energy or the relevant characteristic of an electrical circuit including a resistor connected to the secondary winding of the ignition coil thereby controlling the value of primary current supplied to the ignition coil so that spark energy of optimum level can be supplied to the spark plugs without regard to the type and individuality of the engine.

DESCRIPTION OF THE PREFERRED EMBODIMENTS

Preferred embodiments of the present invention will now be described in detail with reference to the accompanying drawings.

Figure 1:
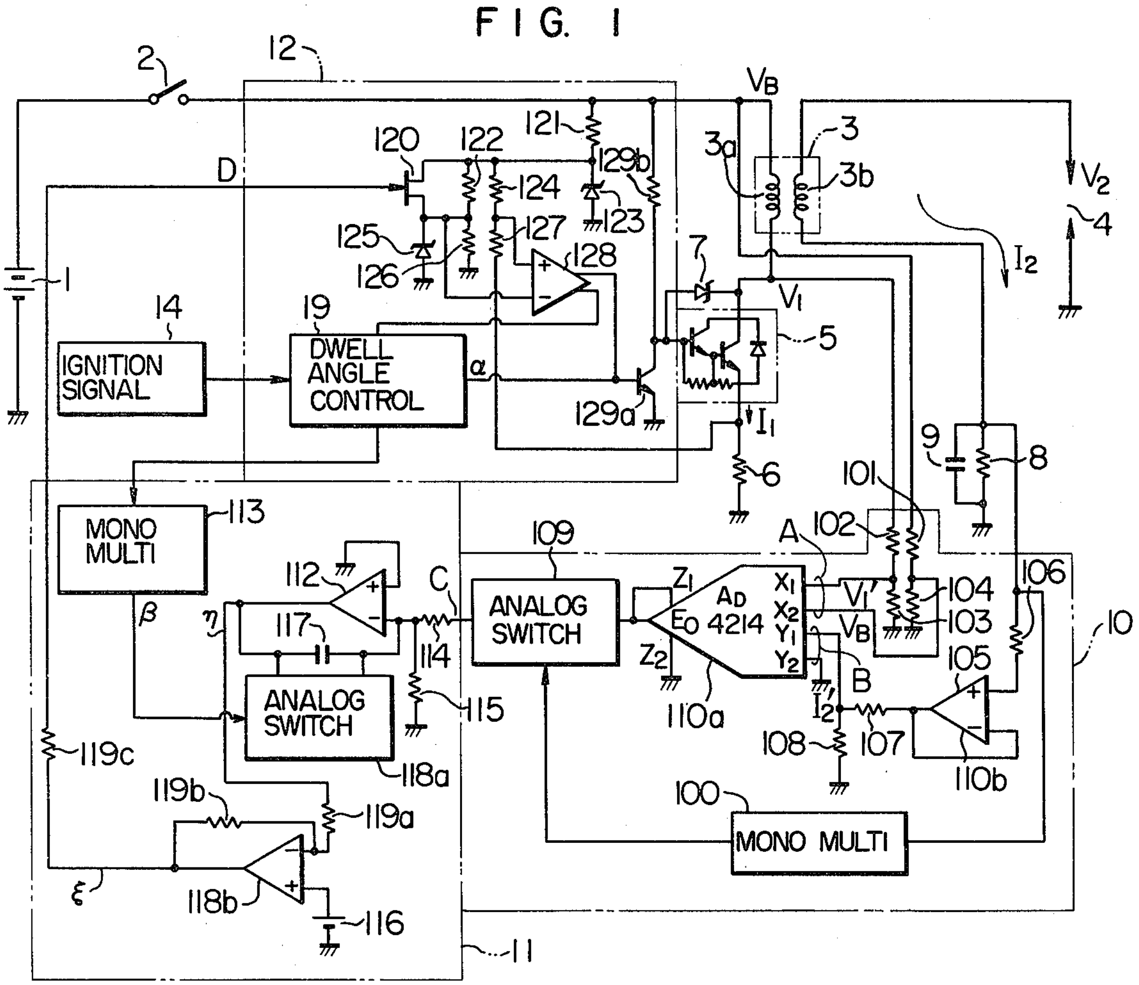
FIG. 1 is an electrical circuit diagram showing in detail the structure of a first embodiment of the ignition system according to the present invention.

Referring first to FIG. 1 showing a first embodiment of the present invention applied to an internal combustion engine, the ignition system includes a battery 1, an ignition switch 2, an ignition coil 3 including a primary winding 3*a* and a secondary winding 3*b*, a spark plug 4, and a primary current detecting resistor 6 detecting the value of primary current supplied to the primary winding 3*a* of the ignition coil 3. A known ignition signal generator 14 generates an ignition signal and includes, for example, an ignition timing detector employing an electromagnetic pickup or an ignition timing signal generator employing an electronic advancer. The ignition signal from the ignition signal generator 14 is applied to a known current-supply duration (dwell angle) control circuit 19 which controls the duration of primary current supplied to the primary winding 3*a* of the ignition coil 3 in response to the application of the ignition signal. A power transistor unit 5 includes a pair of Darlington-connected power transistors or a field effect power transistor, and a Zener diode 7 protects the power transistor unit 5 against breakdown. A current value control circuit 12 controls the primary current supplied to the primary winding *3a* of the ignition coil 3 so that the peak value of primary current can be stabilized or maintained at a predetermined setting. A secondary current detecting resistor 8 detects the spark current flowing through the secondary winding *3b* of the ignition coil 3, and a capacitor 9 is connected in parallel with this resistor 8.

Figure 2:
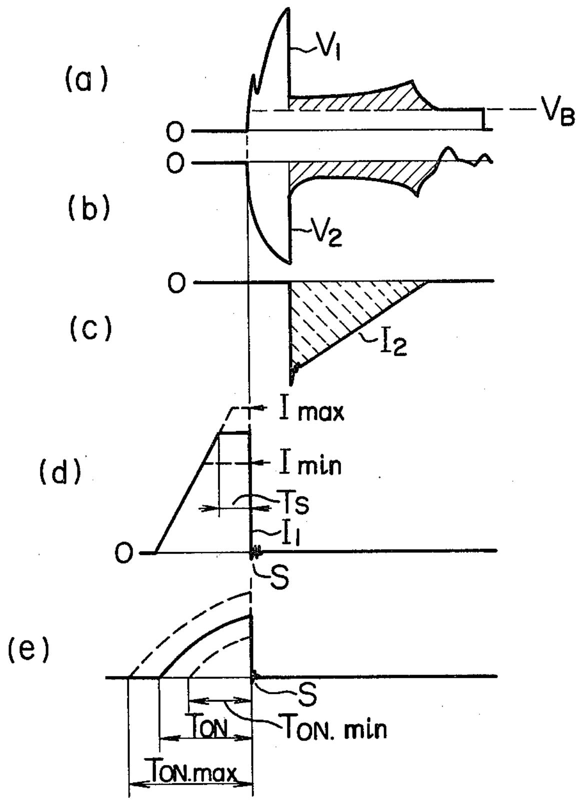
FIG. 2 shows voltage and current waveforms appearing at various parts in FIG. 1 to illustrate the operation of the first embodiment of the present invention.

The primary voltage $V_1$, secondary voltage $V_2$, secondary current $I_2$ and primary current $I_1$ have waveforms as shown in (a), (b), (c) and (d) of FIG. 2 respectively. The spark energy $E_2$ supplied from the ignition coil 3 is given by $E_2=\int V_2 \cdot I_2 dt$. In the waveform of the secondary voltage $V_2$ shown in (b) of FIG. 2, the hatched portion is available for providing the spark energy, and this portion corresponds to the hatched portion in the waveform of the primary voltage $V_1$ shown in (a) of FIG. 2. Therefore, the spark energy $E_2$ is expressed as $E_2=C\int V_1 \cdot I_2 dt$ where C is a constant. Thus, the signal corresponding to the spark energy can be basically obtained by applying the primary voltage $V_1$ and the secondary current $I_2$ to a multiplying circuit 10. In the present invention, the secondary voltage $V_2$ is not used for the calculation of the spark energy $E_2$ for the reason that measurement of the secondary voltage $V_2$ is difficult, and the cost of the system increases, when measuring means is additionally provided.

The output from the multiplying circuit 10 is applied to a constant-current value compensating signal output circuit 11 to be integrated into a predetermined level signal, and this latter signal is applied from the circuit 11 to the current value control circuit 12 to be used for compensating the value of primary current $I_1$ supplied to the primary winding *3a* of the ignition coil 3, so that the peak value of primary current $I_1$ can be limited to within the range of $I_{min}$ and $I_{max}$ shown in (d) of FIG. 2 thereby maintaining the spark energy $E_2$ at a substantially predetermined level. Therefore, the spark energy of predetermined level can be supplied to the spark plug 4 without regard to the type and individuality of the engine by virtue of the above structure, and because of this advantage, the ignition performance of the engine can be improved, and the level of the spark energy can be optimized.

The multiplying circuit 10 carrying out the multiplication for calculating the spark energy includes a multiplier *110a* which is, for example, that of Model No. 4214 manufactured by the Analog Device Corporation in USA. This multiplier *110a* has four inputs $X_1$, $X_2$, $Y_1$ and $Y_2$ to produce an output $E_o$ which is given by $E_o \propto (X_1-X_2)\cdot(Y_1-Y_2)$. The input $X_1$ is provided by a voltage signal $V_1'$ obtained by dividing the primary voltage $V_1$ by voltage-dividing resistors 102 and 103, and the input $X_2$ is provided by a voltage signal $V_B'$ obtained by dividing the power supply voltage (the battery voltage) $V_B$ by voltage-dividing resistors 101 and 104. The input $Y_1$ is provided by a current signal $I_2'$ obtained by supplying the secondary current $I_2$ through a buffer *110b*, and the input $Y_2$ is grounded. Consequently, the output $E_o$ from the multiplier *110a* is given by $E_o \propto (V_1'-V_B')I_2'$, and when $E_o$ is selected to satisfy the relation $E_o=E_2$, a voltage signal proportional to the spark energy $E_2$ can be obtained. A monostable circuit 100 is triggered in response to the fall time of the ignition current (the secondary current $I_2$) to turn on an analog switch 109 which is maintained in its on-state for a predetermined period of time. During the on-time of the analog switch 109, the spark energy output signal $E_o$ from the multiplier *110a* is applied through the analog switch 109 and a buffer 112 to a capacitor 117 in the circuit 11 to be integrated therein. The integrated output is applied to an operational amplifier *118b* to be compared with a reference signal r applied from a reference signal source 116, and the resultant signal is then amplified in the operational amplifier *118b*. The output signal $\xi$ from the operational amplifier *118b* is applied through a resistor *119c* to the input gate of a field effect transistor (FET) 120 in the circuit 12, so that the primary current $I_1$ can be so controlled as to provide the predetermined spark energy. A monostable circuit 113 in the circuit 11 generates a short pulse signal B which is applied to an analog switch *118a* so that the charge stored in the capacitor 117 is discharged at the spark ignition timing of the ignition timing signal, that is, at the appearing timing of the signal turning off the power transistor unit 5. This is done by turning on the analog switch *118a* by the signal $\beta$.

The current value control circuit 12 includes an operational amplifier 128. The voltage signal appearing across the primary current detecting resistor 6 is divided by voltage-dividing resistors 124 and 127 to provide a primary current signal corresponding to the detected value of the primary current $I_1$, and this primary current signal is applied to one of the input terminals of the operational amplifier 128. The output signal from the FET 120 is applied to the other input terminal of the operational amplifier 128 after being divided by voltage-dividing resistors 122 and 126. The former signal is compared with the latter signal in the operational amplifier 128. When the level of the former signal is higher than that of the latter signal a drive transistor *129a* provided for driving the power transistor unit 5 is turned on to decrease the current supplied through a resistor *129b* to the base of the power transistor unit 5 so that the peak value of the primary current $I_1$ supplied to the primary winding *3a* of the ignition coil 3 can be stabilized or maintained at the predetermined value. The output from the other output terminal of the operational amplifier 128 is applied to the dwell angle control circuit 19 as a signal which acts to limit the stabilized period of time $T_S$ of the primary current $I_1$ shown in (d) of FIG. 2 to within the predetermined range.

Figure 3:
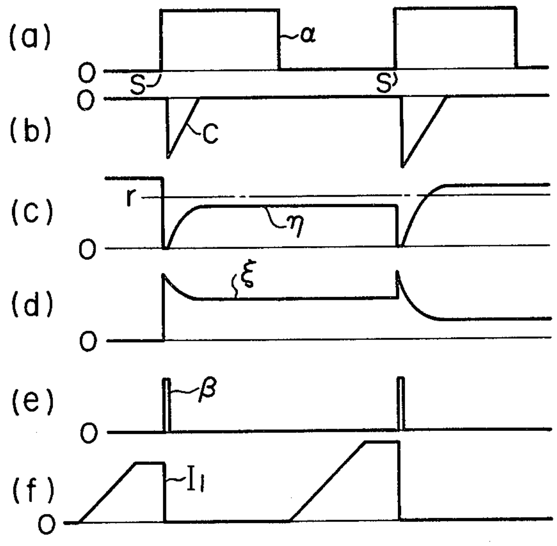
FIG. 3 shows also voltage and current waveforms appearing at various parts in FIG. 1 to illustrate the operation of the first embodiment of the present invention.

FIG. 3 shows voltage and current waveforms appearing at various parts in FIG. 1. FIG. 3 shows in (a) the ignition signal $\alpha$, in (b) the spark energy signal c applied to the circuit 11 by passing the output from the multiplier *110a* through the analog switch 109, in (c) the spark energy signal $\eta$ integrated and held in the capacitor 117, in (d) the difference signal § obtained as the result of comparison between the spark energy signal $\eta$ and the reference signal r in the operational amplifier *118b* to provide the compensating signal applied to the current value control circuit 12, in (e) the reset signal $\beta$ applied to the analog switch *118a* from the monostable circuit 113, and in (f) the primary current $I_1$ supplied to the primary winding *3a* of the ignition coil 3.

It will be seen that, by the functions of the circuits above described, the value of the primary current $I_1$ can be limited to within the predetermined range so that the spark energy can be controlled or maintained at the predetermined level. In FIG. 1, a Zener diode 125 acts as a limiter limiting the upper limit of the primary current value, and the voltage-dividing resistors 122 and 126 constitute a lower limit limiter. A resistor 121 and a Zener diode 123 constitute a constant-voltage circuit.

The system further includes resistors 106, 107, 108, 114, 115, 119_a_ and 119_b_.

Figure 4:
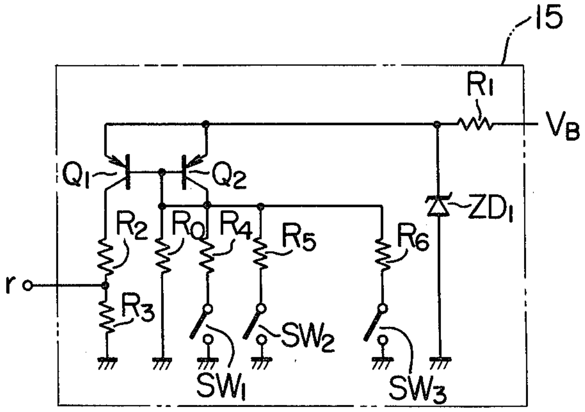
FIG. 4 is an electrical circuit diagram showing in detail the structure of a reference signal compensating circuit which may be employed in place of the reference signal source in the ignition system shown in FIG. 1.

FIG. 4 shows the structure of a simple form of a reference signal compensating circuit 15 which may be employed in place of the reference signal source 116 in the first embodiment of the present invention shown in FIG. 1. Signals indicative of the engine parameters including the temperature of engine cooling water, rotation speed of the engine, EGR (exhaust gas recirculation) and pressure in the intake manifold are applied to this circuit 15 to provide a reference signal indicative of a predetermined function of these parameters. Referring to FIG. 4, a pair of transistors $Q_1$ and $Q_2$ constitute a current mirror circuit, and the reference output r to be applied to the operational amplifier or comparator 118_b_ appears at the connection point between resistors $R_2$ and $R_3$. A plurality of switches $SW_1$, $SW_2$ and $SW_3$ are selectively turned on and off to simply add the selected engine parameters. For example, when EGR is being done, the switch $SW_1$ is turned on to increase the reference signal level. A resistor $R_0$ is provided to establish an initial reference level, and adding resistors $R_4$, $R_5$ and $R_6$ connected to the switches $SW_1$, $SW_2$ and $SW_3$ respectively. Although three switches are shown in FIG. 4, by way of example, the number of switches may be more or less than three. A Zener diode $ZD_1$ and a resistor $R_1$ constitute a constant-voltage circuit for producing a reference voltage.

Figure 5:
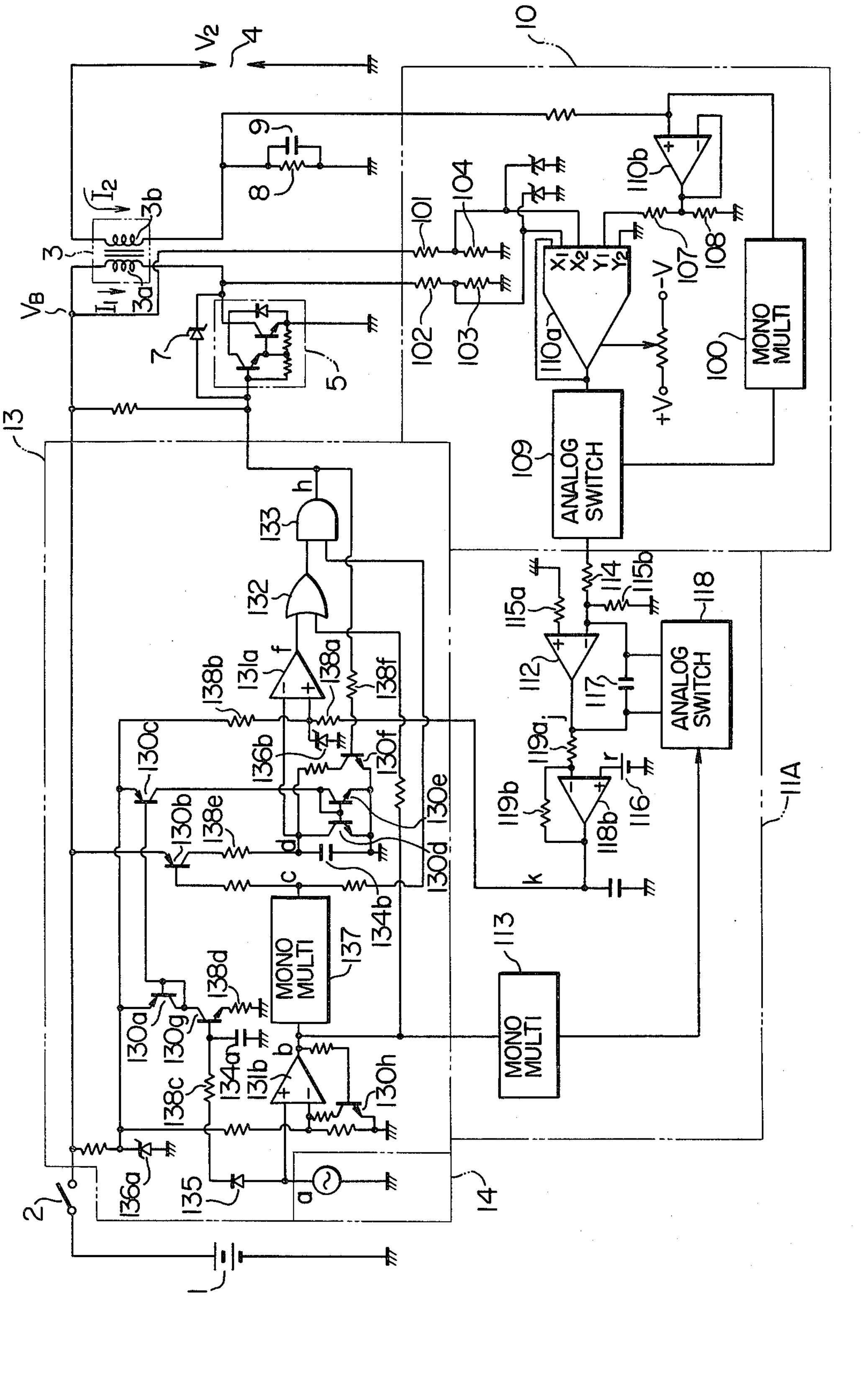
FIG. 5 is an electrical circuit diagram showing in detail the structure of a second embodiment of the ignition system according to the present invention.

FIG. 5 shows a second embodiment of the present invention in which the same or like reference numerals are used to denote the same or like parts appearing in FIG. 1. Referring to FIG. 5, the output signal indicative of the spark energy level from the multiplying circuit 10 is applied to a current-supply duration compensating signal output circuit 11A, and the output from this circuit 11A is applied to a dwell angle control circuit 13 as a current-supply duration compensating signal thereby controlling the duration of the primary current $I_1$ to lie within the range of $T_{ON.min}$ and $T_{ON.max}$ shown in (e) of FIG. 2 so that the spark energy can be controlled or maintained at the predetermined level.

The structure of this current-supply duration compensating signal output circuit 11A is generally the same as that of the constant-current value compensating signal output circuit 11 shown in FIG. 1, except for the provision of resistors 115_a_ and 115_b_. The output signal from the operational amplifier 118_b_ is connected to one end of a voltage-dividing resistor 138_a_ which is connected at the other end thereof to one of the input terminals of a comparator 131_a_. By controlling the voltage applied to this input terminal of the comparator 131_a_, the current-supply duration (the dwell angle) is controlled so that the spark energy can be controlled or maintaned at the predetermined level.

The structure of the dwell angle control circuit 13 will then be described in detail. The ignition signal generator 14 including an electromagnetic pickup generates an AC signal a having a waveform as shown in (a) of FIG. 6, and this AC signal a is applied through a diode 135 and a resistor 138_c_ to a capacitor 134_a_ to charge it with the voltage proportional to the rotation speed of the engine. In the meantime, a comparator 131_b_ generates an output signal b having a waveform as shown in (b) of FIG. 6, and a monostable multivibrator 137 is triggered in response to the fall time of the pulse b to generate an output signal c having a waveform as shown in (c) of FIG. 6. The signal b is also applied to the base of a transistor 130_h_ to provide a positive feedback signal applied to the comparator 131_b_. A transistor 130_b_ is turned on by the signal c and maintained in its on-state during the monostable period of time $T_o$ of the multivibrator 137, and a capacitor 134_b_ is charged through a resistor 138_e_. As a result, the potential d of this capacitor 134_b_ increases as shown by the solid curve in (d) of FIG. 6. Upon termination of the monostable period of time $T_o$, the transistor 130_b_ is turned off, and thereafter, the capacitor 134_b_ discharges through a resistor 138_d_ and transistors 130_g_, 130_a_, 130_c_, 130_e_ and 130_d_ at a rate dependent upon the rotation speed of the engine. As soon as the charged voltage of the capacitor 134_b_ becomes lower than the voltage appearing at the connection point between voltage-dividing resistors 138_a_ and 138_b_, that is, the voltage e shown by the broken curve in (d) of FIG. 6, an output voltage f having a waveform as shown in (e) of FIG. 6 appears from the comparator 131_a_ to be applied through an OR circuit 132 to an AND circuit 133. As a result, the charge stored in the capacitor 134_b_ is discharged quickly through the OR circuit 132, AND circuit 133, resistor 138_f_ and transistor 130_f_. An output signal h having a waveform as shown in (f) of FIG. 6 appears thus from the AND circuit 133 to drive the power transistor unit 5 thereby supplying the spark energy to the spark plug 4. The current-supply duration compensating signal output circuit 11A generates an output signal k having a waveform as shown in (j) of FIG. 6 for compensating the current-supply duration on the basis of the result of measurement of the spark energy. The potential e at the connection point between the voltage-dividing resistors 138_a_ and 138_b_ is controlled by the output signal k applied from the circuit 11A through the resistor 138_a_ so that the spark energy can be controlled or maintained at the predetermined level.

Figure 6:
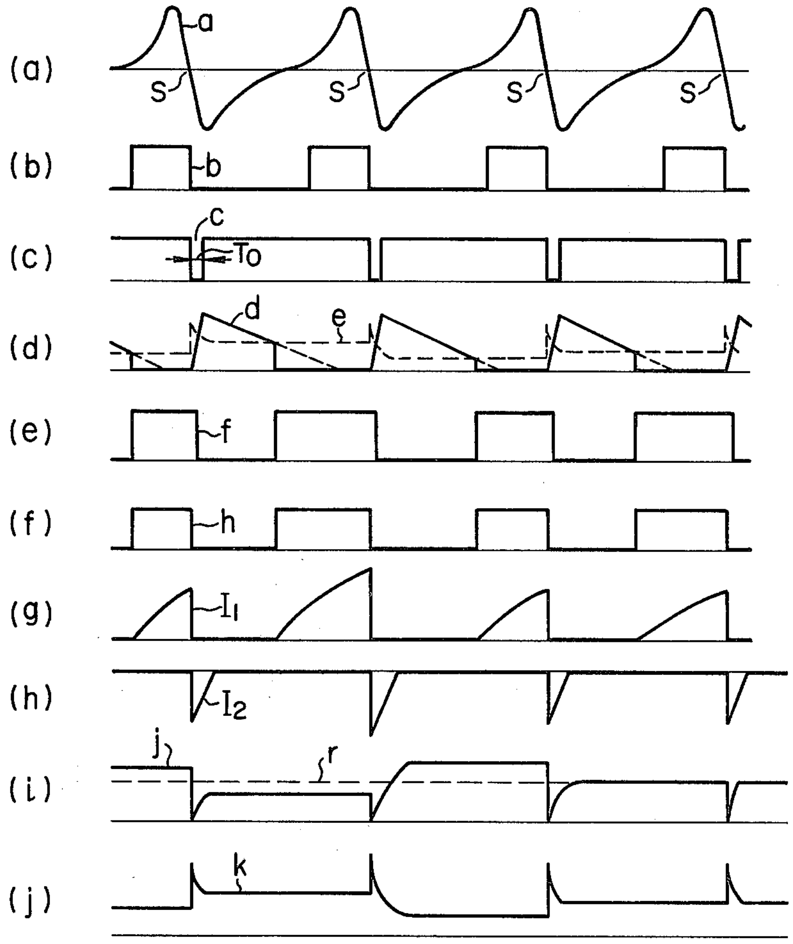
FIG. 6 shows voltage and current waveforms appearing at various parts in FIG. 5 to illustrate the operation of the second embodiment of the present invention.

The output signal b, shown in (b) of FIG. 6, from the comparator 131_b_ is also applied to the other input terminal of the OR circuit 132. When the engine is rotating in its low rotation speed range, the pulse width of the output signal f from the comparator 131_a_ is smaller than that of the output signal b from the comparator 131_b_, and the output signal b from the comparator 131_b_ appears from the OR circuit 132. Therefore, in a low rotation speed range lower than a predetermined value, the output signal b from the comparator 131_b_ controls the dwell angle of the primary current $I_1$ at a predetermined duty ratio.

The output signal c, shown in (c) of FIG. 6, from the monostable multivibrator 137 is applied to the other input terminal of the AND circuit 133. When the engine is rotating in its high rotation speed range, the pulse width of the output signal f from the comparator 131_a_ is larger than that of the output signal c from the monostable multivibrator 137, and the output signal c from the monostable multivibrator 137 appears from the AND circuit 133. Therefore, in a high rotation speed range higher than a predetermined value, too, the dwell angle of the primary current $I_1$ is controlled by the output signal c from the monostable multivibrator 137 so that the constant coil off-time $T_o$ can be always ensured.

A Zener diode 136_b_ is provided to act as an upper limit limiter, and another Zener diode 136_a_ acts as a constant-voltage circuit. FIG. 6 shows the waveforms of the primary current $I_1$ and secondary current $I_2$ in the ignition coil 3 in (g) and (h) respectively. The solid curve and broken curve in (i) of FIG. 6 show the waveforms the output signal j from the buffer 112 and the reference signal r from the reference signal source 116 respectively.

Figure 7:
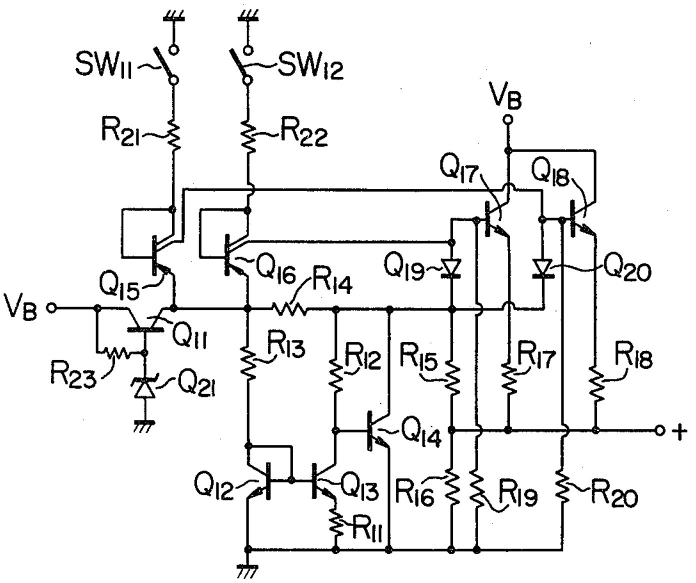
FIG. 7 is an electrical circuit diagram showing in detail the structure of one form of the reference signal compensating circuit which may be employed in the ignition system shown in FIG. 5.

FIG. 7 shows the structure of another form of the reference signal compensating circuit 15 which may be employed in place of the reference signal source 116 in the second embodiment of the present invention. Referring to FIG. 7, switches $SW_{11}$ and $SW_{12}$ are turned on and off by signals from sensors sensing the engine parameters, for example, EGR (exhaust gas recirculation) and the temperature of engine cooling water respectively, and a suitable combination of resistors $R_{15}$, $R_{16}$, $R_{17}$ and $R_{18}$ varies the level of the reference voltage output r. Transistors $Q_{11}$, $Q_{12}$, $Q_{13}$ and $Q_{14}$ constitute a constitute a constant-voltage power supply. The circuit 15 further includes resistors $R_{11}$ to $R_{14}$ and $R_{19}$ to $R_{23}$, transistors $Q_{15}$ to $Q_{18}$, diodes $Q_{19}$, $Q_{20}$, and a Zener diode $Q_{21}$.

In the first and second embodiments of the present invention described hereinbefore, the primary current value and the current-supply duration are compensated to maintain the predetermined spark energy level in each ignition cycle. However, they may be compensated every two revolutions of the engine crankshaft or every n ignition cycles (where n is a suitable positive integer). Further, the control of the spark energy for the individual engine cyclinders can also be attained by providing an engine cylinder identifying circuit.

The reference signal compensating circuit 15 which is constructed to make analog compensation of the level of the reference voltage r as shown in FIG. 4 or FIG. 7 may be replaced by another circuit in which necessary compensation data corresponding to the engine parameters such as the intake manifold vacuum and engine rotation speed are previously stored in a digital memory. In such a circuit, those corresponding to the sensed engine parameters are read out from the digital memory, and the read-out compensation data are then subjected to then subjected to digital-analog conversion to provide the desired reference voltage r.

In the aforementioned first and second embodiments of the present invention, the multiplying circuit 10 operates as a spark energy calculating circuit. However, the values of secondary current, primary voltage and necessary engine parameters may be converted into a digital signal which is used as an address input for reading out a corresponding one of spark energy data stored previously in a digital memory, and this read-out spark energy data may be directly used for the digital control of the primary current or may be converted into an analog signal to be used for the analog control of the primary current.

Figure 8:
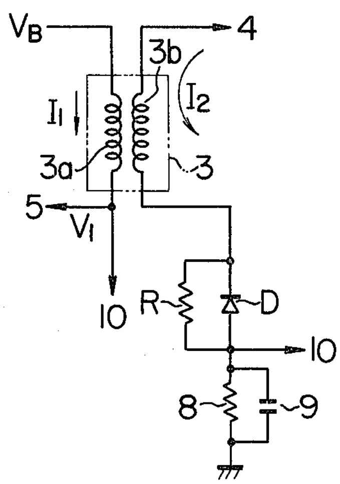
FIG. 8 is an electrical circuit diagram showing in detail the structure of an ignition monitoring circuit which may be employed in the first and second embodiments of the present invention.

A partial modification of the first and second embodiments of the present invention is shown in FIG. 8. Referring to FIG. 8, a parallel circuit of a light-emitting diode D and a resistor R is inserted between the secondary winding 3*b* of the ignition coil 3 and the secondary current detecting resistor 8, so that the state of ignition can be monitored by the light emitted from the light-emitting diode D.

Figure 9:
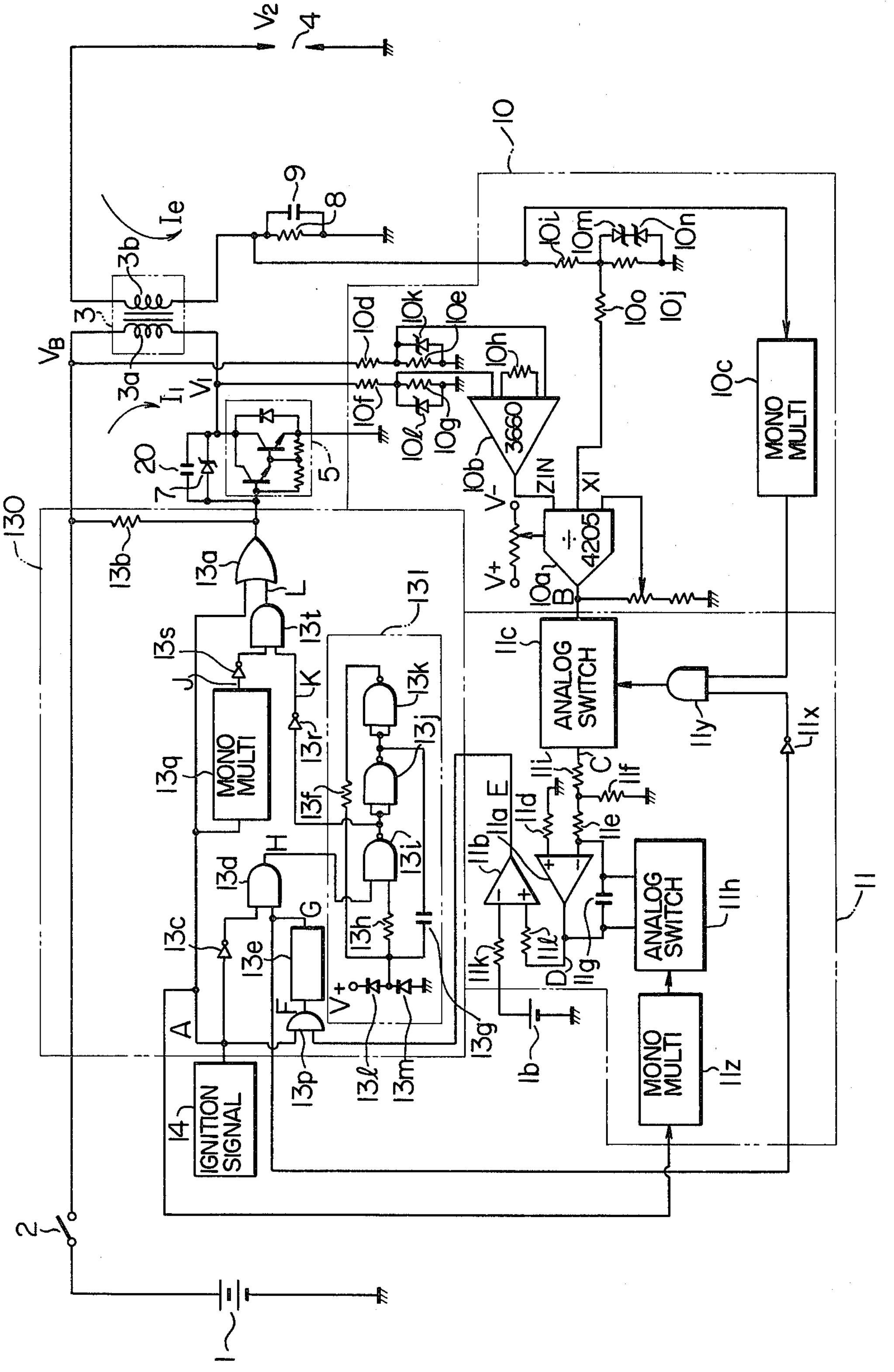
FIG. 9 is an electrical circuit diagram showing in detail the structure of a third embodiment of the ignition system according to the present invention.
Figure 10:
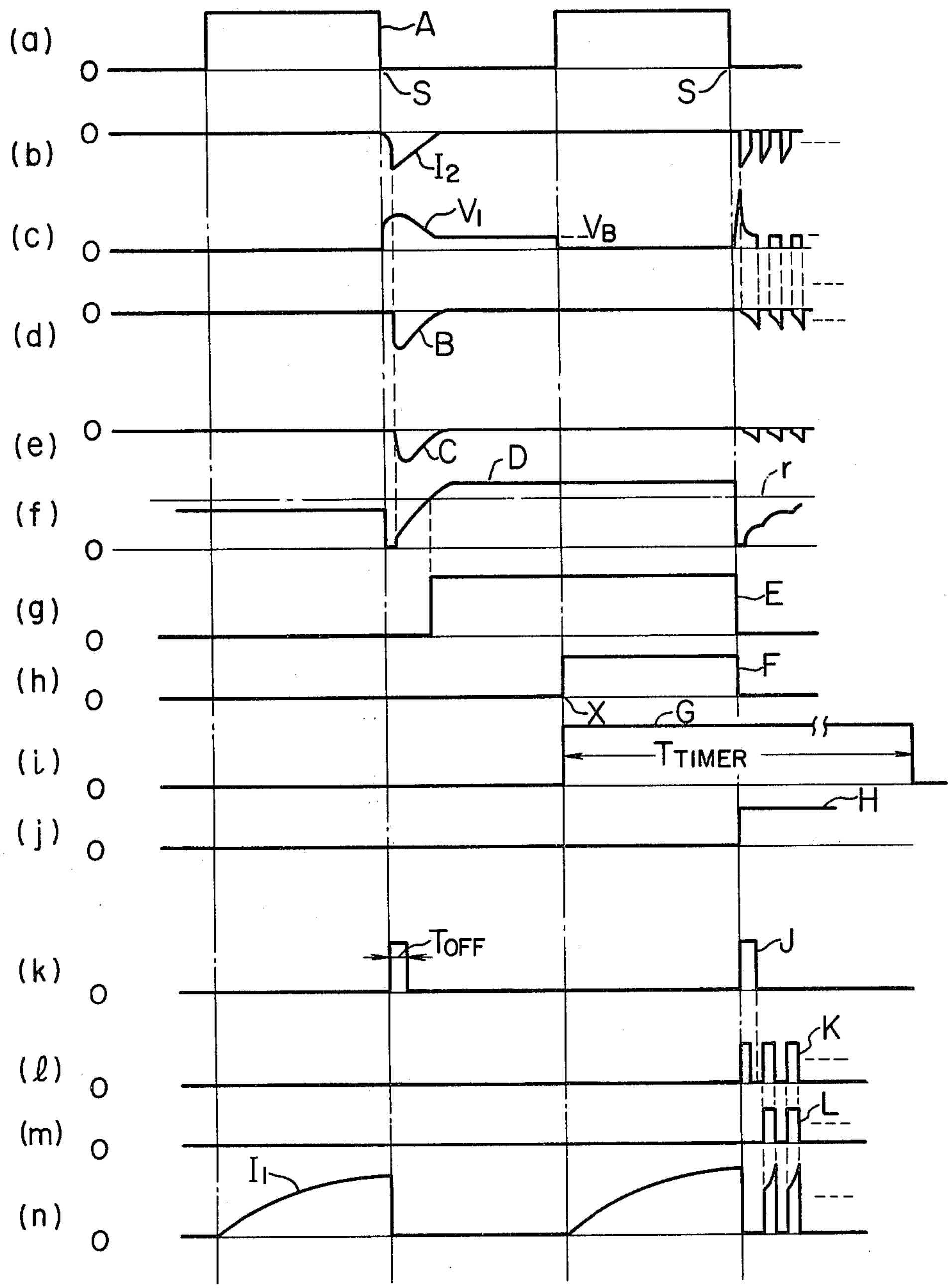
FIG. 10 shows voltage and current waveforms appearing at various parts in FIG. 9 to illustrate the operation of the third embodiment of the present invention.

FIG. 9 shows a third embodiment of the present invention in which the same or like reference numerals are used to denote the same or like parts appearing in FIG. 1. FIG. 10 shows voltage and current waveforms appearing at various parts in FIG. 9. The structure and operation of this third embodiment will be described in detail with reference to FIGS. 9 and 10.

The power supply voltage $V_B$ of the battery 1 is applied across voltage-dividing resistors 10*d* and 10*e* and also across a Zener diode 10*k*. The voltage appearing at the connection point between these voltage-dividing resistors 10*d* and 10*e* is applied to one of the input terminals of a measured voltage amplifier 10*b* which is, for example, that of Model No. 3660 manufactured by the Analog Device Corporation. FIG. 10 shows in (c) the waveform of the primary voltage $V_1$ applied across the primary winding 3*a* of the ignition coil 3. This primary voltage $V_1$ is applied across voltage-dividing resistors 10*f* and 10*g* and also across a Zener diode 10*l*. The voltage appearing at the connection point between the voltage-dividing resistors 10*f* and 10*g* is applied to the other input terminal of the measured voltage amplifier 10*b*. This amplifier 10*b* calculates the voltage corresponding to $(V_1 - V_B)$, and the resultant output indicative of $(V_1 - V_B)$ is applied from the amplifier 10*b* to the Z input of a divider 10*a* which is, for example, that of Model No. 4205 manufactured by the Analog Device Corporation.

FIG. 10 shows in (b) the waveform of the secondary current $I_2$ detected by the secondary current detecting resistor 8. The voltage corresponding to this secondary current $I_2$ is applied across voltage-dividing resistors 10*i*, 10*j* and also across Zener diodes 10*m*, 10*n*. The voltage appearing at the connection point between these voltage-dividing resistors 10*i* and 10*j* is applied through a resistor 10*o* to the $X_1$ input of the divider 10*a*. The divider 10*a* calculates the value corresponding to $(V_1 - V_B)/I_2$, and the resultant signal B having a waveform as shown in (d) of FIG. 10 is applied from the divider 10*a* to an analog switch 11*c*. Thus, this signal B is indicative of the secondary resistance of the ignition coil 3.

A monostable multivibrator 10*c* is triggered in response to the rise time of the secondary current $I_2$ and generates a pulse output having a predetermined pulse width. This pulse output from the monostable multivibrator 10*c* is applied through an AND circuit 11*y* to the analog switch 11*c* to turn on the same, and the output B from the divider 10*a* passes through this analog switch 11*c* to provide a signal C having a waveform as shown in (e) of FIG. 10. This signal C is applied through resistors 11*i*, 11*f* and 11*e* to one of the input terminals or inverting input terminal of an operational amplifier 11*a*. The non-inverting input terminal of this operational amplifier 11*a* is grounded through a resistor 11*d*, and a capacitor 11*g* is connected between the inverting input terminal and the output terminal of this operational amplifier 11*a*. Therefore, during the operating period of time of the monostable multivibrator 10*c*, the capacitor 11*g* is charged with the signal C as shown by the solid curve D in (f) of FIG. 10. In other words, the capacitor 11*g* is charged up to a voltage level D of the value corresponding to the integrated value or means value of the secondary resistance of the ignition coil 3 during the on-time of the monostable multivibrator 10*c*.

A monostable multivibrator 11*z* is triggered in response to the fall time, indicating the ignition timing S, of the ignition signal A generated from the ignition signal generator 14 and generates a pulse output which turns on an analog switch 11*h* momentarily. The voltage D charged in the capacitor 11*g* is discharged in response to the turning-on of the analog switch 11*h*. This voltage signal D is applied through a resistor 11*l* to the plus input terminal of a comparator 11*b*. A reference voltage r as shown by the one-dot chain curve in (f) of FIG. 10 is applied through a resistor 11*k* to the minus input terminal of the comparator 11*b* from a reference signal source 16. Therefore, the comparator **11*b* generates an output signal E having a waveform as shown in (g) of FIG. 10 when the level of the voltage D applied from the capacitor 11*g* exceeds that of the reference voltage r applied from the reference signal source 16, that is, when the secondary resistance of the ignition coil 3 exceeds the critical value at which sooting occurs in the spark plug 4**.

The output signal E from the comparator **11*b* and the ignition signal A shown in (a) of FIG. 10 are applied to an AND circuit 13*p*, and an output signal F having a waveform as shown in (h) of FIG. 10 appears from this AND circuit 13*p* to be applied to a timer circuit 13*e*. In response to the rise time of this signal F, the timer circuit 13*e* generates an output signal G which maintains its "1" level during a predetermined number of ignition cycles or during a predetermined period of time $T_{TIMER}$ as shown in (i) of FIG. 10. The output signal G appearing from this timer circuit 13*e* is applied through an inverter 11*x* to the AND circuit 11*y* so as to turn off the analog switch 11*c* and to maintain the analog switch 11*c* in the off-state during the period of time in which the signal G appears from the timer circuit 13*e***.

The output signal G from the timer circuit **13*e* and the signal obtained by inverting the ignition signal A from the ignition signal generator 14 by an inverter 13*c* are applied to an AND circuit 13*d*, and an output signal H having a waveform as shown in (j) of FIG. 10 appears from the AND circuit 13*d*. An astable multivibration 131 oscillates continuously while this signal H maintains its "1" level. This astable multivibrator 131 is composed of a capacitor 13*g* resistors 13*f*, 13*h*, NAND circuits 13*i*, 13*j*, 13*k* and diodes 13*l*, 13*m*. The output signal from the NAND circuit 13*i* in the astable multivibrator 131 is inverted by an inverter 13*r* to provide a signal K having a waveform as shown in (l) of FIG. 10. A monostable multivibrator 13*q* is triggered in response to the fall time, indicating the ignition timing S, of the ignition signal A from the ignition signal generator 14 and generates a signal J which maintains its "1" level for a predetermined period of time $T_{OFF}$ as shown in (k) of FIG. 10. The signal obtained by inverting this signal J by an inverter 13S and the signal from the inverter 13*r* are applied to an AND circuit 13*t*, and an output signal L having a waveform as shown in (m) of FIG. 10 appears from this AND circuit 13*t*. This signal L and the ignition signal A from the ignition signal generator 14 are applied to an OR circuit 13*a*, and the output signal from this OR circuit 13*a* is applied to the power transistor unit 5 to drive the same thereby periodically interrupting the primary current $I_1$ supplied to the primary winding 3*a* of the ignition coil 3. Consequently, the primary current $I_1$ is interrupted in a manner as shown in (m) of FIG. 10. Thus, when sooting occurs in the spark plug 4, the power transistor unit 5 is turned on-off at a high frequency at the ignition timing thereby continuously applying a high voltage of high frequency to the spark plug 4 so that, during the exhaust or suction stroke of the piston, carbon accummulating on the surface of the insulator in the vicinity of the electrodes of the spark plug 4 thereby sooting the spark plug 4** can be burnt away to be completely removed.

A practical form of the reference signal source 16 in the third embodiment of the present invention may include a combination of a resistor and a Zener diode connected between the ignition switch 2 and ground, and the reference voltage r is derived from the connection point therebetween. However, the reference signal source 16 is in no way limited to such a fixed voltage source and may be such that its reference voltage output r is variable depending on some of the engine parameters, for example, the temperature of engine cooling water and the temperature of engine intake air.

In the third embodiment of the present invention shown in FIG. 9, the multiple ignition circuit 13 is inserted between the ignition signal generator 14 and the power transistor unit 5. However, a DC-DC converter for the multiple ignition purpose may be independently provided in lieu of the circuit 13.

Figure 11:
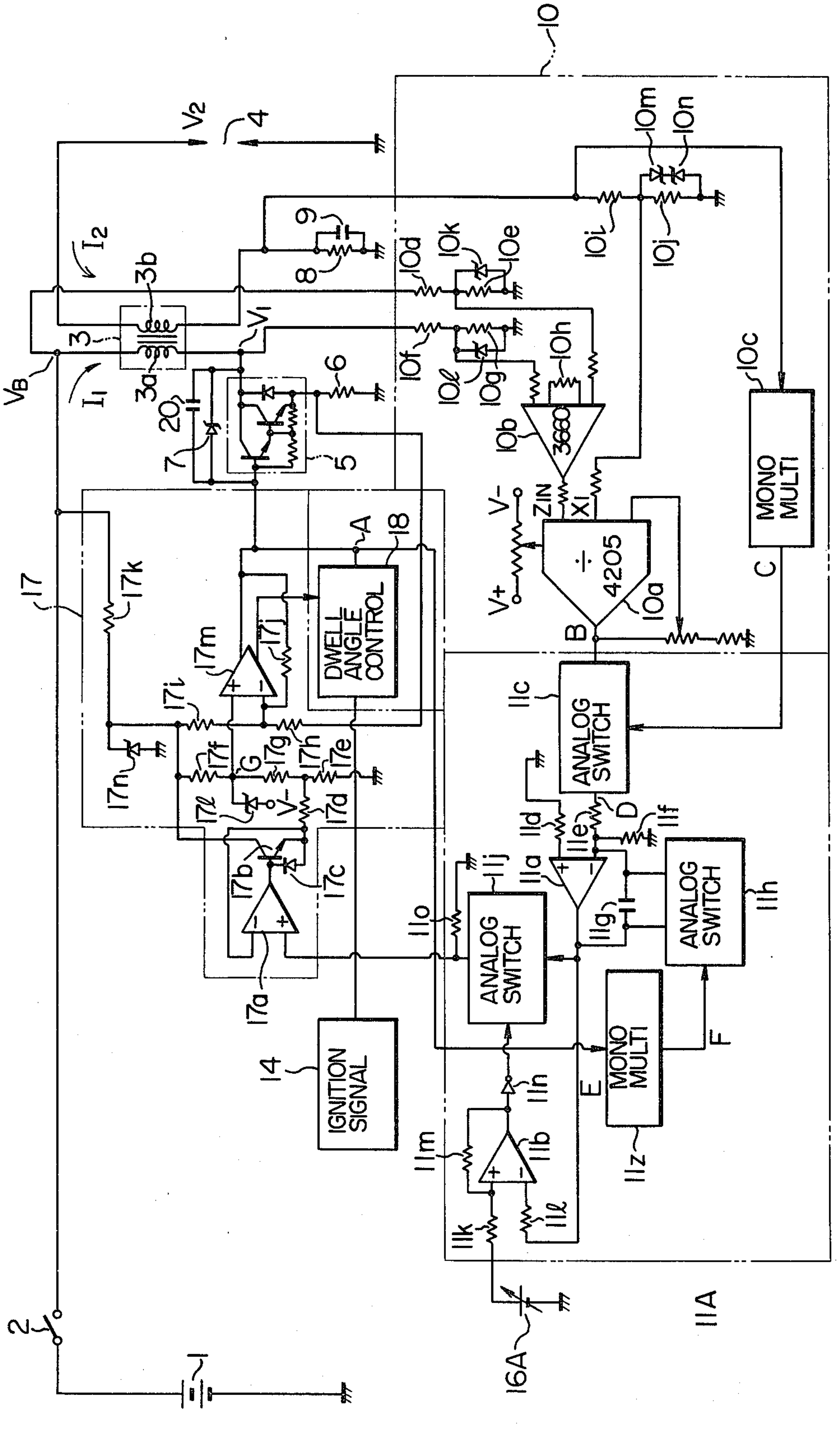
FIG. 11 is an electrical circuit diagram showing in detail the structure of a fourth embodiment of the ignition system according to the present invention.

FIG. 11 shows a fourth embodiment of the present invention in which the same or like reference numerals are used to denote the same or like parts appearing in FIG. 9.

Referring to FIG. 11, a current compensating circuit 11A compensates the constant-current control value of a primary current stabilizing circuit 17 thereby controlling the base current of the power transistor unit 5 when the level of the signal B corresponding to the secondary resistance of the ignition coil 3 calculated by the divider **10*a* exceeds that of a reference signal generated from a reference signal source 16A. Consequently, the peak value of the primary current $I_1$ supplied to the primary winding 3*a* of the ignition coil 3 is controlled to lie within the range of $I_{min}$ and $I_{max}$ shown in (d) of FIG. 2, and an increase in the spark resistance due to the increase in the secondary resistance of the ignition coil 3 is detected so as to control the spark energy. A dwell angle control circuit 18 controls the on-time of the power transistor unit 5 turned on in response to the ignition signal generated from the ignition signal generator 14. The primary current detecting resistor 7 detects the primary current $I_1$ supplied to the primary winding 3*a* of the ignition coil 3**.

Figure 12A:
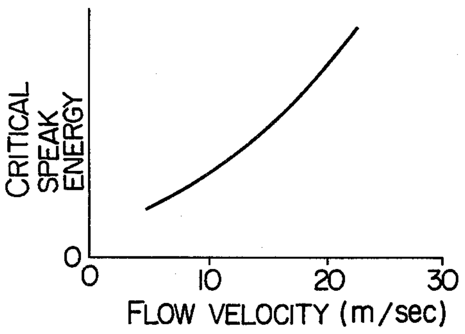
FIG. 12A is a graph showing of the stream of the air-fuel mixture and the critical spark energy in an internal combustion engine.
Figure 12B:
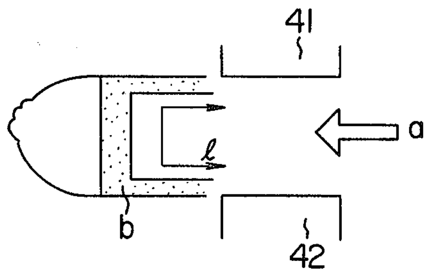
FIG. 12B is a schematic view to illustrate the state of the arc channel extending between the electrodes of the spark plug.

FIG. 12A is a graph showing the relation between the critical ignition energy and the velocity of the stream of the air-fuel mixture in the vicinity of the electrodes of the spark plug 4. It will be seen in FIG. 12A that the critical ignition energy increases with the increase in the velocity of the stream of the air-fuel mixture. The reason will be explained with reference to FIG. 12B. FIG. 12B shows that the air-fuel mixture is flowing in a direction as shown by the arrow a, and an arc jumps across the electrodes 41 and 42 of the spark plug 4. When the velocity of the stream of the air-fuel mixture flowing in the direction a is relatively high, the arc channel b is bent, and the path l of the arc is elongated resulting in an increased spark resistance. Therefore, the ignition performance can be improved when the spark resistance is detected as being indicative of the secondary resistance of the ignition coil 3 used to control the primary current $I_1$ supplied to the ignition coil 3 thereby controlling the spark energy, as described with reference to FIG. 11 showing the fourth embodiment of the present invention. Similarly, an increase in the spark gap between the electrodes 41 and 42 of the spark plug 4 due to, for example, wear of the spark electrodes 41 and 42 results in an elongation of the arc channel b, hence, an increased spark resistance. According to the fourth embodiment of the present invention, therefore, the spark energy can also be controlled depending on the length of the spark gap of the spark plug 4 thereby further improving the ignition performance.

The detailed structure of the ignition system shown in FIG. 11 will now be described. The current compensating circuit 11A shown in FIG. 11 is generally similar to the comparing circuit 11 shown in FIG. 9 except that a feedback resistor 11m is connected between the plus input terminal and the output terminal of the comparator 11b, and the output signal from the comparator 11b is applied to the control input terminal of an analog switch 11j after being inverted by an inverter 11n. The input terminal of this analog switch 11j is connected to the output terminal of the operational amplifier 11a, and a resistor 11o is connected to the output terminal of the analog switch 11j. The output terminal of the operational amplifier 11a is connected to the minus input terminal of the comparator 11b, and the reference signal source 16A is connected to the plus input terminal of the comparator 11b.

The reference voltage generated from this reference signal source 16A is set at the level corresponding to the secondary resistance value 50 kΩ of the ignition coil 3. When the level of the output voltage from the capacitor 11g exceeds that of the reference voltage from the reference signal source 16A, that is, when the value of the secondary resistance of the ignition coil 3 exceeds 50 kΩ, the output signal from the comparator 11b turns into its "0" level, and this signal is inverted by the inverter 11n to turn on the analog switch 11j so as to apply the output voltage from the capacitor 11g to the primary current stabilizing circuit 17. This primary current stabilizing circuit 17 includes a voltage-current converter composed of an operational amplifier 17a connected at its plus input terminal to the output terminal of the analog switch 11j, a transistor 17b, a diode 17c and a resistor 17d. The circuit 17 further includes resistors 17e to 17k, a Zener diode 17l connected to the power supply terminal V− so that the potential at the connection point between the resistors 17f and 17g may not rise above a predetermined level, an operational amplifier 17m, and a Zener diode 17n functioning as a constant-voltage element.

The operation of the fourth embodiment having the above structure will now be described. The analog switch 11j is in its off-state when the secondary resistance of the ignition coil 3 is sufficiently low, and the divided constant voltage appearing at the connection point between the resistor 17f and the series resistors 17g, 17e is applied to the plus input terminal of the operational amplifier 17m. When the terminal voltage of the primary current detecting resistor 7 proportional to the primary current $I_1$ becomes higher than the voltage appearing at the voltage dividing point above described, the potential level of the output from the operational amplifier 17m is lowered to decrease the base current of the power transistor unit 5. Consequently, the power transistor unit 5 operates in its unsaturated region thereby limiting the peak value of the primary current $I_1$ to $I_{min}$ shown in (d) of FIG. 2. The output from the other output terminal of the operational amplifier 17m is applied to the dwell angle control circuit 18 which controls the starting time of turning on the power transistor unit 5 so as to minimize the period of time $T_S$ in (d) of FIG. 2 during which time the primary current $I_1$ is stabilized to be constant.

On the other hand, when the value of the secondary resistance of the ignition coil 3 exceeds the predetermined value, the analog switch 11j is turned on, with the result that the current corresponding to the charged voltage of the capacitor 11g is supplied through the operational amplifier 17a, transistor 17b and resistor 17d to the resistor 17e, and the potential appearing at the connection point between the resistors 17g and 17f rises to the level corresponding to the charged voltage of the capacitor 11g. Thus, with the increase in the secondary resistance of the ignition coil 3, the level of the input signal applied to the plus input terminal of the operational amplifier 17m is correspondingly increased to increase the peak value of the primary current $I_1$ between $I_{min}$ and $I_{max}$ shown in (d) of FIG. 2 thereby increasing the spark energy.

Figure 13:
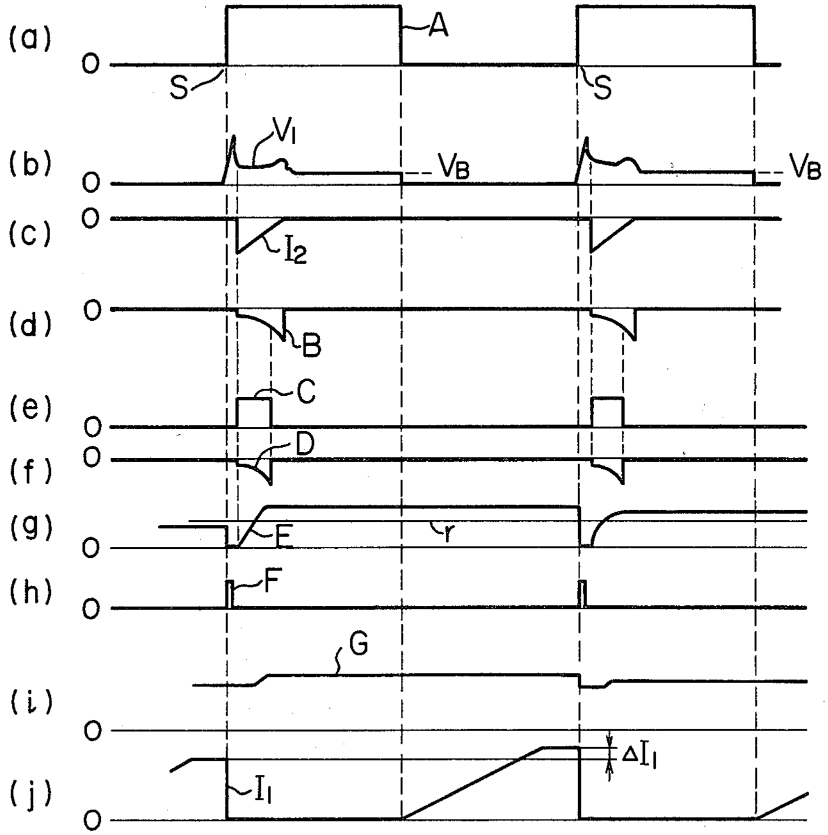
FIG. 13 shows voltage and current waveforms appearing at various parts in FIG. 11 to illustrate the operation of the fourth embodiment of the present invention.

FIG. 13 shows voltage and current waveforms appearing at various parts of the ignition system shown in FIG. 11. The waveform of the ignition signal A generated from the ignition signal generator 14 is shown in (a) of FIG. 13. The waveform of the primary voltage $V_1$ applied across the primary winding 3a of the ignition coil 3 is shown in (b) in FIG. 13. The waveform of the secondary current $I_2$ flowing through the secondary winding 3b of the ignition coil 3 is shown in (c) of FIG. 13. The waveform of the output signal B from the divider 10a is shown in (d) of FIG. 13. The waveform of the output signal C from the monostable multivibrator 10c is shown in (e) of FIG. 13. The waveform of the output signal D from the analog switch 11c is shown in (f) of FIG. 13. The charged voltage E of the capacitor 11g and the reference voltage r generated from the reference signal source 16A are shown in (g) of FIG. 13. The waveform of the output signal F from the monostable multivibrator 11z is shown in (h) of FIG. 13. The waveform of the voltage G appearing at the connection point between the resistors 17f and 17g is shown in (i) of FIG. 13. The waveform of the primary current $I_1$ is shown in (j) of FIG. 13.

Figure 14:
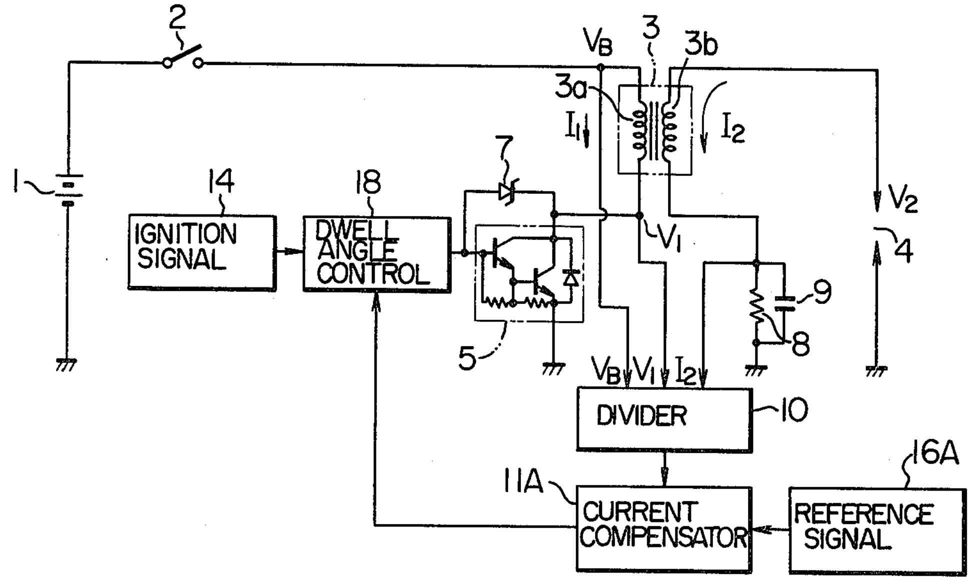
FIG. 14 is an electrical circuit diagram showing in detail the structure of a fifth embodiment of the ignition system according to the present invention.

FIG. 14 shows a fifth embodiment of the present invention in which the same or like reference numerals are used to denote the same or like parts appearing in FIG. 11. In this fifth embodiment, the dwell angle control circuit 18 is controlled so that the current-supply duration of the primary current $I_1$ is variable between $T_{ON.min}$ and $T_{ON.max}$ shown in (e) of FIG. 2 depending on the output signal from the current compensating circuit 11A, whereby the spark energy can be controlled depending on the value of the secondary resistance of the ignition coil 3.

Figure 15:
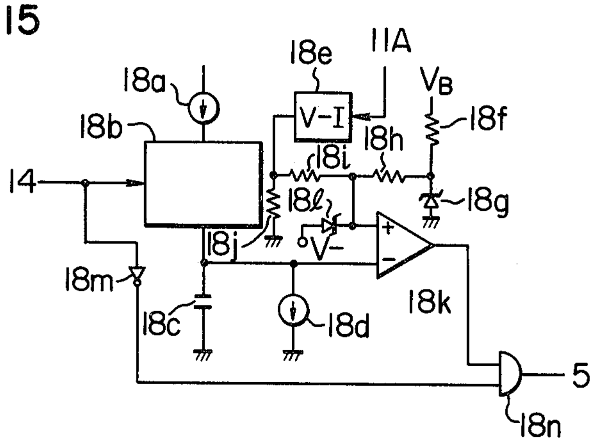
FIG. 15 is an electrical circuit diagram showing in detail the structure of one form of the dwell angle control circuit in the ignition system shown in FIG. 14.

FIG. 15 shows a practical form of the dwell angle control circuit 18 preferably employed in the ignition system shown in FIG. 14. Referring to FIG. 15, the dwell angle control circuit 18 is composed of a constant-current charging circuit 18a, an analog switch 18b turned on and off in response to the output from the ignition signal generator 14, a capacitor 18c charged with the current from the charging circuit 18a during the on-time of the analog switch 18b, a constant-current discharging circuit 18d providing a discharging path pf the stored charge of the capacitor 18c discharging the voltage at a constant current value, a voltage-current converter 18e generating an output current corresponding to the output from the current compensating circuit 11A, a resistor 18f and a Zener diode 18g constituting a constant-voltage circuit, voltage-dividing resistors 18h, 18i, 18j, a comparator 18k, a Zener diode 18l connected to the power supply terminal V− so that the level of the input applied to the plus input terminal of the comparator 18k may not exceed a predetermined level, an inverter 18m inverting the ignition signal from the ignition signal generator 14, and an AND circuit 18n receiving the outputs from the inverter 18m and comparator 18k as its inputs.

Figure 16:
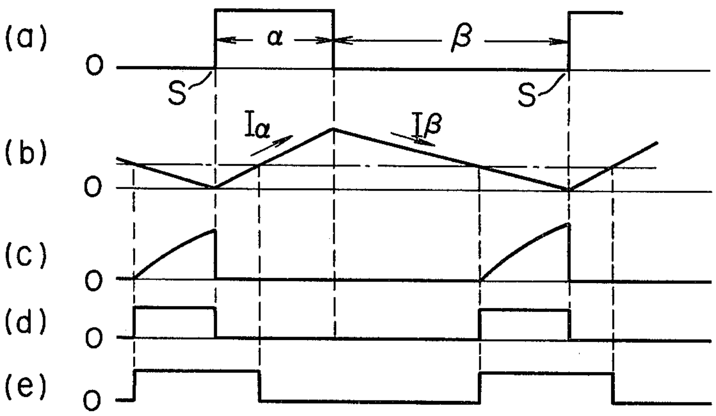
FIG. 16 shows voltage and current waveforms appearing at various parts in FIG. 15 to illustrate the operation of the dwell angle control circuit.

The operation of the dwell angle control circuit 18 shown in FIG. 15 will be described with reference to a waveform diagram shown in FIG. 16. Subsequent to the ignition timing S, the ignition signal generated from the ignition signal generator 14 turns into its "1" level as shown in (a) of FIG. 16, and the analog switch 18*b* is turned on. The ignition signal maintains its "1" level during a predetermined period of time corresponding to a predetermined crank angle α. During this period of time, the capacitor 18*c* is charged with the current from the constant-current charging circuit 18*a* as shown by $I_\alpha$ in (b) of FIG. 16. Then, when the ignition signal generated from the ignition signal generator 14 turns into its "0" level to turn off the analog switch 18*b*, the charge stored in the capacitor 18*c* is discharged by the constant-current discharging circuit 18*d* as shown by $I_\beta$ in (b) of FIG. 16 during a predetermined period of time corresponding to a predetermined crank angle β, that is, during the period of time in which the ignition signal generated from the ignition signal generator 14 remains in its "0" level. The output from the comparator 18*k* turns into its "1" level as shown in (e) of FIG. 16 when the charged voltage of the capacitor 18*c* decreases to a level lower than the potential level at the connection point between the resistors 18*i* and 18*h*, which level is shown by the one-dot chain line in (b) of FIG. 16. In response to the application of the outputs from the comparator 18*k* and inverter 18*m* to the AND circuit 18*n*, an output signal having a waveform as shown in (d) of FIG. 16 appears from the AND circuit 18*n* to turn on-off the power transistor unit 5.

The potential at the connection point between the resistors 18*i* and 18*h* has a constant level determined by the voltage dividing ratio between the resistors 18*i*, 18*j* and the resistor 18*h*, since the analog switch 11*j* in the current compensating circuit 11A is in its off-state when the secondary resistance of the ignition coil 3 is sufficiently low. When the secondary resistance of the ignition coil 3 exceeds a predetermined value, the analog switch 11*j* in the current compensating circuit 11A is turned on, and the current corresponding to the charged voltage of the capacitor 11*g* is supplied through the voltage-current converter 18*e* to the resistor 18*j* thereby increasing the potential at the connection point between the resistors 18*i* and 18*h*. Consequently, the dwell angle of the primary current $I_1$ supplied to the ignition coil 3 is increased between $T_{ON\ min}$ and $T_{ON\ max}$ shown in (e) of FIG. 2 due to the increase in the secondary resistance of the ignition coil 3. FIG. 16 shows in (c) the waveform of the primary current $I_1$ supplied to the primary winding 3*a* of the ignition coil 3.

Although, in the aforementioned third, fourth and fifth embodiments of the present invention, the voltage corresponding to the integrated value (the mean value) of the secondary resistance of the ignition coil 3 during the monostable time of the monostable multivibrator 10*c* is obtained for the purpose of comparison, the time-based mean of the integrated value may be obtained by dividing the integrated value by the monostable time of the monostable multivibrator 10*c*.

Further, the aforementioned third, fourth and fifth embodiments of the present invention may include a cylinder identifying circuit so as to attain the spark energy control for each of the engine cylinders.

Further, although the secondary resistance of the ignition coil 3 is detected in each ignition cycle in the third, fourth and fifth embodiments of the present invention, it may be detected every two revolutions of the engine crankshaft or every n ignition cycles (where n is a suitable positive integer).

Furthermore, although the analog control elements are employed in the third, fourth and fifth embodiments of the present invention for the analog control of the spark ignition energy, a digital divider and an up-down counter may be employed for the digital control of the spark ignition energy. Moreover, although the secondary resistance computing circuit including the divider is provided to calculate the secondary resistance of the ignition coil 3, the primary voltage $V_1$, the power supply voltage $V_B$ and the secondary current $I_2$ may be converted into corresponding digital signals which may be applied as an address input for reading out one of the secondary resistance data previously stored in a digital memory.

I claim:

1. An ignition system for an internal combustion engine comprising an ignition signal generator generating an ignition signal in synchronism with the rotation of the engine, a power transistor unit turned on-off in response to the ignition signal generated from said ignition signal generator, an ignition coil including a primary winding and a secondary winding electrically isolated from each other, the primary winding being connected to said power transistor unit turned on-off to interrupt the primary current supplied to the primary winding of said ignition coil, a spark plug connected to one end of the secondary winding of said ignition coil, a secondary current detecting resistor connected between the other end of the secondary winding of said ignition coil and an earth potential point for detecting the secondary current flowing through the secondary winding of said ignition coil, a calculating circuit receiving both of the secondary current detected by said secondary current detecting resistor and the primary voltage detected by a primary voltage resistor connected to a grounded side end of the primary winding of said ignition coil as its input signals for calculating, on the basis of these input signals, an ignition control value representing the characteristics of the secondary electrical circuit of said ignition coil, and means responsive to the output signal from said calculating circuit for controlling the high voltage applied across said spark plug.

2. An ignition system for an internal combustion engine as claimed in claim 1, wherein said control means includes a primary current control circuit.

3. An ignition system for an internal combustion engine as claimed in claim 2, wherein said primary current control circuit includes a primary current detecting resistor connected to the primary winding of said ignition coil for detecting the primary current supplied to the primary winding of said ignition coil, a current value control circuit controlling the peak value of the primary current detected by said primary current detecting resistor so as to limit the peak value to a predetermined setting, and a constant-current value compensating signal output circuit compensating the setting of said current value control circuit so that the characteristic of the secondary electrical circuit calculated by said calculating circuit can be maintained at a predetermined setting.

4. An ignition system for an internal combustion engine as claimed in claim 3, wherein the setting of said constant-current value compensating signal output circuit is variable depending on at least one of the engine parameters.

5. An ignition system for an internal combustion engine as claimed in claim 2, wherein said primary current control circuit includes a dwell angle control circuit controlling the dwell angle of said power transistor unit in response to the ignition signal generated from said ignition signal generator, and a current-supply duration compensating signal output circuit compensating the setting of said dwell angle control circuit so that the characteristic of the secondary electrical circuit calculated by said calculating circuit can provide a predetermined value.

6. An ignition system for an internal combustion engine as claimed in claim 5, wherein the duration compensating output signal from said current-supply duration compensating signal output circuit is variable depending on at least one of the engine parameters.

7. An ignition system for an internal combustion engine as claimed in claim 1 wherein said calculating circuit includes a multiplier.

8. An ignition system in accordance with claim 1, wherein said calculating circuit comprises a secondary resistance calculating circuit receiving the secondary current detected by said secondary current detecting resistor and the primary voltage across the primary winding of said ignition coil as its input signals for calculating, on the basis of these input signals, the value of the secondary resistance of said ignition coil, a comparing circuit comparing the value of the secondary resistance calculated by said secondary resistance calculating circuit with a predetermined value representing the critical point of accumulation of soot on the electrodes of said spark plug and generating a sooting indicative output when the latter value exceeds the former value, and sooting removing means acting to remove the accumulating soot in response to the appearance of the sooting indicative output from said comparing circuit.

9. An ignition system for an internal combustion engine as claimed in claim 8, wherein said secondary resistance calculating circuit includes a divider.

10. An ignition system for an internal combustion engine as claimed in claim 8, wherein said sooting removing means acts to induce soot cleaning spark discharge in said spark plug or to apply a high voltage not so high as to induce spark discharge in said spark plug during the exhaust stroke or suction stroke of the piston in the engine.

11. An ignition system for an internal combustion engine as claimed in claim 8, wherein said sooting removing means includes a multiple ignition circuit continuously applying a high voltage at a high frequency to said spark plug.

12. An ignition system for an internal combustion engine as claimed in claim 8, wherein said predetermined value to be compared with said secondary resistance value is variable depending on at least one of the engine parameters.

13. An ignition system in accordance with claim 1 wherein said calculating circuit comprises a secondary resistance calculating circuit receiving the secondary current detected by said secondary current detecting resistor and the primary voltage across the primary winding of said ignition coil as its input signals for calculating, on the basis of these input signals, the value of the secondary resistance of said ignition coil, and a primary current control circuit controlling the primary current supplied to the primary winding of said ignition coil so as to increase the spark energy with the increase in the value of the secondary resistance calculated by said secondary resistance calculated by said secondary resistance calculating circuit.

14. An ignition system for an internal combustion engine as claimed in claim 13, wherein said primary current control circuit includes a primary current detecting resistor connected to the primary winding of said ignition coil for detecting the primary current supplied to the primary winding of said ignition coil, a primary current stabilizing circuit controlling the peak value of the primary current detected by said primary current detecting resistor to limit the peak value to a predetermined setting, and a current compensating circuit acting to increase the peak value of the primary current of said ignition coil limited by said primary current stabilizing circuit when the value of the secondary resistance calculated by said secondary resistance calculating circuit exceeds the predetermined value.

15. An ignition system for an internal combustion engine as claimed in claim 13, wherein said primary current control circuit includes a dwell angle control circuit controlling the duration of the primary current supplied to the primary winding of said ignition coil in response to the ignition signal generated from said ignition signal generator, and a current compensating circuit acting to elongate the duration of the primary current of said ignition coil limited by said dwell angle control circuit when the value of the secondary resistance calculated by said secondary resistance calculating circuit exceeds the predetermined value.

16. An ignition system for an internal combustion engine as claimed in claim 14 or 15, wherein the predetermined value of the second resistance compared in said current compensating circuit with the calculated value of the secondary resistance is variable depending on at least one of the engine parameters.

* * * * *